Nov. 8, 1966  K. LEUTWYLER  3,284,105
REMOTELY CONTROLLED CONNECTIONS
Filed Aug. 12, 1963  2 Sheets-Sheet 1
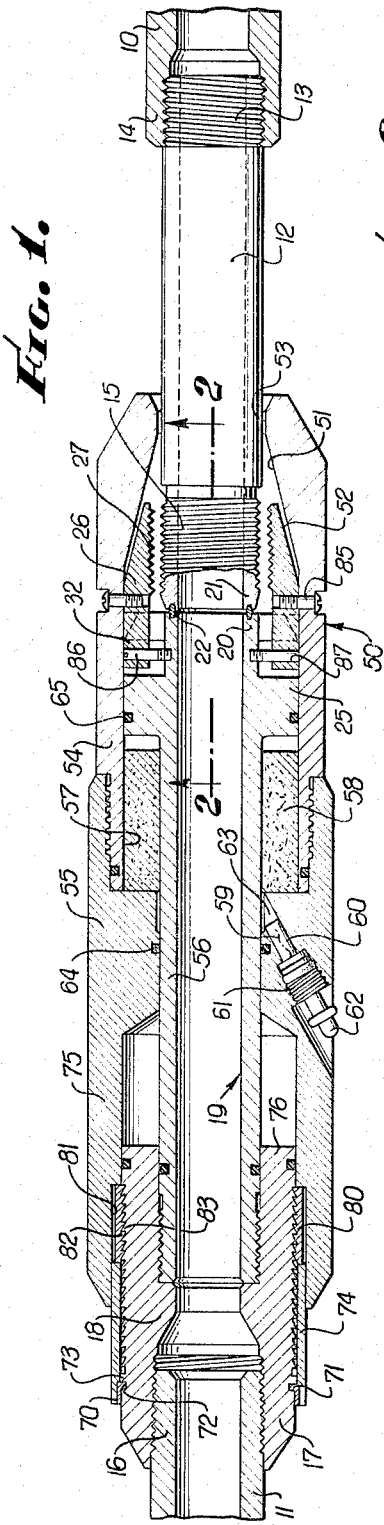
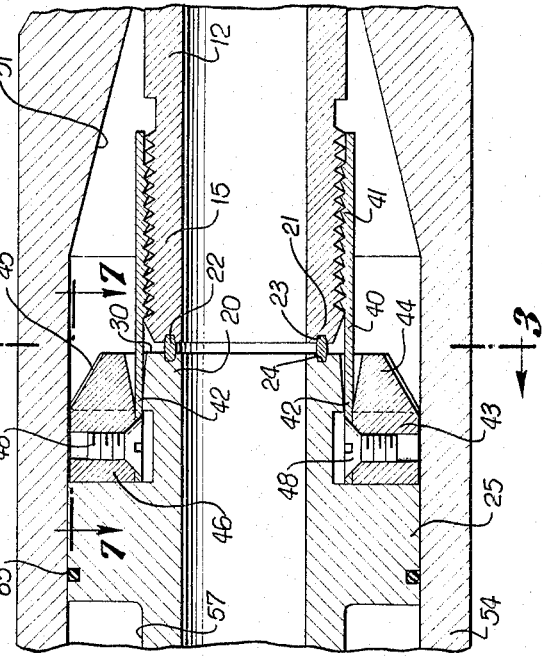
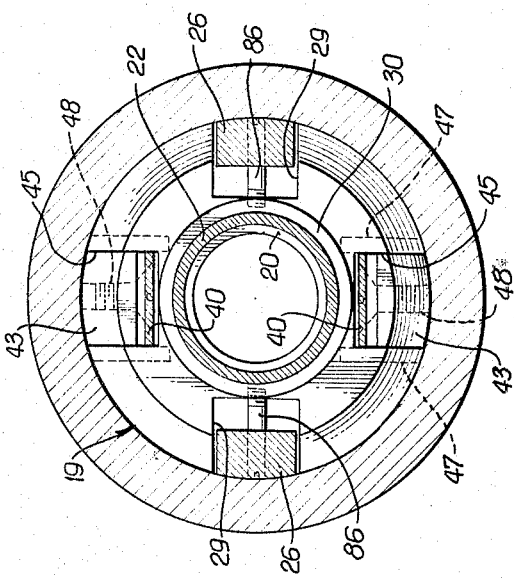
INVENTOR.
*Kurt Leutwyler*
BY
*Mellin and Hanscom*
ATTORNEYS.

Nov. 8, 1966  K. LEUTWYLER  3,284,105
REMOTELY CONTROLLED CONNECTIONS
Filed Aug. 12, 1963  2 Sheets-Sheet 2
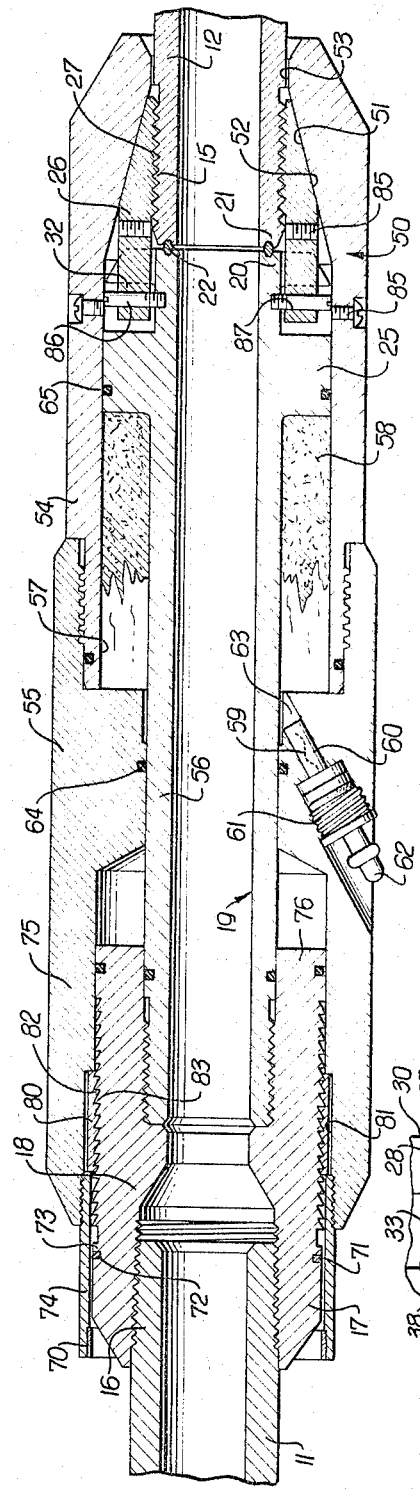
INVENTOR.
KURT LEUTWYLER
BY
Mellin and Hanscom
ATTORNEYS.

United States Patent Office 3,284,105
Patented Nov. 8, 1966

3,284,105
REMOTELY CONTROLLED CONNECTIONS
Kurt Leutwyler, Whittier, Calif., assignor to Baker Oil Tools, Inc., Los Angeles, Calif., a corporation of California
Filed Aug. 12, 1963, Ser. No. 301,379
9 Claims. (Cl. 285—3)

The present invention relates to the connection of parts to one another, such as the interconnection of tubular members having threaded joints.

It is difficult to connect flow or pipe lines to one another in certain environments, such as underwater or in space, in view of the absence of a reaction point that would permit the use of normal tools for effecting pipe connections, such as wrenches, and the like. An object of the present invention is to provide a joint that requires no external reaction point in connecting parts to one another since the reaction is embodied in the joint itself.

Another object of the invention is to provide a threaded joint or connection, which can be made up without the necessity for turning or rotating any of its parts.

A further object of the invention is to provide a threaded joint or connection having a self-contained energy source for interconnecting parts of the joint, actuation of the energy source being controlled from a remote point, if desired.

An additional object of the invention is to provide a threaded joint or connection capable of being tightened by a self-contained source of energy which constantly acts to maintain the joint in its tightened condition.

Yet another object of the invention is to provide a pipe joint or connection containing its own source of energy for coupling the joint elements to one another in leakproof condition and for maintaining such leakproof condition.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a longitudinal section through an apparatus embodying the invention, with the parts in their initial relative positions prior to actuation of the apparatus;

FIG. 2 is an enlarged longitudinal section taken along the line 2—2 on FIG. 1;

FIG. 3 is a cross-section taken along the line 3—3 on FIG. 2;

FIG. 4 is an enlarged longitudinal section similar to FIG. 1 disclosing the connection partially completed;

FIG. 5 is an enlarged, fragmentary, longitudinal section showing the parts with the connection fully completed;

FIG. 6 is an enlarged section taken along the line 6—6 on FIG. 5;

FIG. 7 is a section taken along the line 7—7 on FIG. 2.

As illustrated in the drawings, it is desired to effect a connection between adjacent joints 10, 11 of a pipe line or other flow line which may be located in a comparatively inaccessible region, or one in which relative turning of parts cannot be effected except with difficulty. For example, a threaded connection is to be made in a flow line extending from a well underlying a body of water and a shore line, platform, or floating barge. A tubular sub or nipple 12 has a pin end 13 threadedly connected to a threaded box 14 of the pipe section 10, the tubular sub also having a threaded pin 15 at its other end of either a right-hand or left-hand thread, as desired, on its periphery. As shown, the thread 15 of the pin is straight.

Another pipe line section 11 has a threaded pin 16 threadedly connected to the female box 17 of a body sub 18 threadedly secured onto the main body 19 of the connecting device. This body has an end portion 20 remote from its sub 18 adapted to be placed adjacent to and in confronting relation with the end portion 21 of the threaded tubular sub 12, the two parts being sealed against one another through use of an intervening seal ring 22, which may be made of a malleable metal, such as mild steel. The opposite ends of the ring 22 are tapered and are adapted to be received in companion opposed tapered grooves 23, 24 in the end faces of the tubular sub 12 and body 19 of the tool. Initially, the seal ring 22 may be secured to the body 19 within its end groove 24.

The body includes an enlargement 25 at its end adjacent to the seal ring 22 that carries a plurality of circumferentially spaced coupling elements or segments 26, the segments being adapted to be moved inwardly to place their internal threads 27 in full meshing engagement with the external threads 15 on the inner tubular member 12. The pitch and lead of the internal threads 27 on the segments correspond to the pitch of the external threads 15 on the inner tubular member. The circumferentially spaced segments 26 each have an intermediate portion 28 received within a longitudinal groove 29 extending inwardly from the periphery of the body enlargement, this groove opening through the end face 30 of the body and also into a circumferential groove 31 in the body opening outwardly through its periphery. The intermediate portion 28 of each segment merges into a head portion 32 having tongues 33 extending in opposite directions and adapted to underlie and engage the outer flange 34 of the body formed by its peripheral groove 31, in order to limit the extent of longitudinal movement in an outward direction of the segments 26 relative to the body 19. The flange 34 itself engages in opposed grooves 35 in the sides of each segment, the grooves having an axial extent greater than the width of the flange 34 to allow the segments to move longitudinally a limited distance with respect to the body 19. In this connection, the head portion 32 and its tongues 33 have an axial extent which is substantially less than the width of the circumferential groove 31, so that the inner end 37 of the head is spaced from the inner side wall 38 of the circumferential groove.

Also carried by the enlarged portion 25 of the body 19 of the connector apparatus are a set of circumferentially spaced leaf springs 40 disposed circumferentially between the coupling segments 26. These leaf springs extend longitudinally and have inner teeth 41 conforming to the pitch of the threads 15 of the inner tubular member 12. The inner portion 42 of each spring is connected to a mounting block or member 43 that includes an outer neck portion 44 conforming in width to the width of the spring 40 and mounted in a longitudinal groove 45 in the body flange 34, this neck portion merging into an integral head 46 having outwardly and oppositely directed sections 47 disposed under the body flange 34 and extending in the circumferential body groove 31 in engagement with the base 38 of the groove. The leaf springs 40 are attached to the block portions 43 in any suitable manner, as by use of screws 48. Such leaf springs, as described hereinbelow, accomplish a preliminary location of the threaded pin 15 of the tubular sub adjacent to the body 19 of the tool and within the coupling elements of segments 26.

The internally threaded segments 26 are initially disposed laterally outwardly of the threads 15 and are adapted to be shifted inwardly into threaded mesh with the external threads 15 of the inner tubular member 12. A shifting device or collar 50 is mounted on the body 19 of the tool and has an inner tapered cam surface 51 extending axially outward of the end 20 of the body and also outwardly beyond the ends of the segments 26, the cam surface tapering inwardly towards the axis of the body in a direction away from its seal ring 22. Such tapered surface 51 is adapted to engage companion externally tapering surfaces 52 of the coupling segments 26 for the purpose of shifting the segments inwardly into meshing engagement with the external thread 15 of the tubular sub or nipple 12 upon longitudinal movement of the collar 50 along the body 19 of the tool.

The collar has an outer entrance opening 53 larger in diameter than the tubular sub 12 to permit its threaded pin portion 15 to pass therethrough to the interior of the collar 50 and into a position adjacent to the end 20 of the body. The collar also slides along the periphery of the body enlargement 25, such enlargement actually constituting a piston. The collar itself includes a cylinder skirt or sleeve 54 extending along the body and threadedly secured to a cylinder head 55 which is slidable along the smaller diameter portion 56 of the elongate body 19 of the apparatus.

Initially, the cylinder head 55 and piston 25 are axially spaced from one another, there being an annular chamber 57 defined therebetween, and also between the body 19 of the tool and the cylinder skirt or sleeve 54 adapted to contain an annular gas generating power charge or propellant 58 which is adapted to burn away and generate a gas at an increasing pressure. The power charge or propellant 58 contains its own source of oxygen and may be in the nature of a railway flare, fusee, or the like, such as described in United States Patent No. 2,640,547. Ignition of the power charge is dependent upon the completion of an electrical circuit through the resistance filament 59 of a cartridge 60 mounted in the cylinder head 55, being held therewithin by a firing head 61 threaded into the cylinder head and having an appropriate connector 62 on its exterior adapted to be connected to a suitable electrical energy source.

When the igniter filament 59 is energized, the cartridge 60 is fired, the flame passing through an interconnecting passage 63 in the head opening into the chamber for the purpose of igniting the power charge 58, which then commences burning away to generate gas under pressure in the chamber 57. Leakage of the gas under pressure from the chamber is prevented by a suitable seal ring 64 in the cylinder head adapted to slidably seal on the periphery of the body 19, and also by a suitable seal ring 65 on the piston adapted to slidably seal against the inner wall of the cylinder skirt 54. Such generation of pressure will shift the cylinder or collar 50 along the body 19 of the tool in a direction away from the end 20 of the body and will bring the tapered cam or shifting surface 51 of the collar against the companion surfaces 52 of the coupling segments 26, shifting the latter inwardly into meshing engagement with the external threads 15 of the tubular sub 12.

Initially, longitudinal movement of the cylinder 50 along the body 19 is prevented by a releasable shear ring 70 having an internal flange 71 received within the peripheral groove 72 in the box sub 18 and bearing against a shoulder 73 on a thrust sleeve 74 mounted on the exterior of the body sub and threadedly secured to a skirt portion 75 of the cylinder 50 extending outwardly from the cylinder head 55. The cylinder head 55 is longitudinally spaced from the inner end 76 of the box sub to permit movement of the cylinder 50 along the body 19 of the apparatus when the threaded connection is to be effected. However, such movement cannot occur until the flange 71 of the shear ring is sheared from the main body of the ring, whereupon the entire outer cylinder device 50 can shift along the body 19 of the tool.

Return movement of the cylinder 50 is prevented by a one-way lock device in the form of a split ratchet ring 80 mounted in an internal groove 81 formed between the extension portion 75 of the cylinder and the inner end of the thrust sleeve 74, which ring has internal ratchet teeth 82 thereon meshing with companion external ratchet teeth 83 on the body sub 18 and extending longitudinally therealong. The ratchet teeth 82, 83 face in such directions as to permit movement of the cylinder 50 longitudinally along the body 19 of the tool to shift the coupling segments 26 radially inwardly, but preclude reverse longitudinal movement of the cylinder 50 and the parts attached thereto.

The coupling elements 26 are initially retained in their outward ineffective position by shear screws 85 attaching them to the outer collar 50 and with their tapered cam surfaces 52 axially spaced from the companion tapered surface 51 of the collar. With the shear screws 85 intact, the heads 32 of the segments 26 engage the body flange 34, such heads being spaced from the upper side 38 of the peripheral body groove 31 and being initially positioned in such spaced relation by shear pins 86 extending into radial bores 87 in the heads and threadedly secured to the body 19 of the tool. Each shear pin 86 makes a slidable fit in its companion bore 87, these shear pins having a substantially greater shear value than the shear screws 85 attaching the segments 26 to the collar 50.

In connecting the pipe sections 10, 11 to one another, the body sub 18 will have previously been threadedly attached to one of the pipe sections 11 and the tubular sub 12 threadedly attached to its adajacent pipe section 10. The connector apparatus parts are in the position illustrated in FIG. 1, with the shear ring 70, shear screws 85, and shear pins 86 intact. The tubular sub 12 is stabbed into the collar 50 of the joint to place its groove 23 against the seal ring 22. During insertion of the threaded pin 15, its threads will ratchet over the tapered internal teeth or threads 41 of the leaf springs 40, which shift inwardly into meshing relation with such threads 15 to hold the end 21 of the tubular sub 12 against the seal ring 22, with the latter disposed at least partially axially in the perpiheral groove 23 of the tubular sub.

The circuit to the igniter filament 59 is then completed to fire the cartridge 60, the resulting flame igniting the power charge 58 which commences burning away and generating gas at increasing pressure, the gaseous pressures acting in one longitudinal direction on the piston 25 and in the opposite direction on the cylinder head 55, tending to shift the outer cylinder portion 50 along the body 19 and its cam 51 toward the body piston 25, or to the left as seen in FIG. 1. When the gas pressure reaches a value exceeding the shear strength of the shear ring 70, the flange 71 of the latter is sheared and the fluid force acting on the cylinder 50 can then operate to shear the screws 85 attaching the segments 26 to the outer collar or cylinder 50. As the pressure increases, such screws 85 are disrupted and the cylinder 50 moves along the body, its tapered cam surface 51 engaging the companion tapered surfaces 52 on the segments 26 and shifting the latter radially inwardly to bring their threads 27 into full meshing engagement with the threads on the pin 15, thereby threadedly attaching the tubular sub 12 to the body 19. During inward shifting of the segments, their head portions 32 slide inwardly along the shear pins 86 (FIG. 4).

As the power charge or propellant 58 continues to burn away, the gas pressure in the chamber of cylinder space 57 continues to increase, urging the outer cylinder member 55 away from the piston 25. The pressure will increase to the point at which the shear strength of the shear pins 86 is overcome, which will then cause the cam surface 51 to transmit the shifting motion through the tapered surface 52 to the segments 26 and through the segment threads 27 to the external threads 15 of the tubular sub 12, shifting the sub 12 toward the body 19 and further compressing the seal ring 22 therebetween to insure a leakproof connection between the part (FIG. 5). The gaseous pressure may continue to increase as the power charge 58 continues to burn away, further compressing the seal ring 22 between the end faces 21, 20 of the tubular sub and the body of the apparatus, until the heads 32 of the segments 26 bottom against or engage the inner side 38 of the peripheral body groove 31.

The gas pressure is trapped in the chamber 57 and is constantly acting on the cylinder and piston heads 55, 25, urging the outer cylinder or collar 50 along the body 19 and holding the segments 26 tightly in meshing engagement with the external threads of the tubular sub 12. In the event the gas pressure becomes dissipated, the parts are held in their coupled and locked relation since the one-way split ratchet ring 80, which has shifted or ratchetted along the external teeth 83 of the body sub, will preclude return on reverse longitudinal shifting of the cylinder 50 along the body 19 of the tool.

By virtue of the apparatus described, the parts have been permanently locked to one another in leakproof relation. The connection has been made without the necessity for the use of wrenches or other tools, or in turning any of the parts. It is merely necessary to stab the sub 12 into the box portion 26 of the apparatus and then ignite the propellant 58 to secure and complete the connection. Thus, a diver working underwater without any firm substance on which to react is capable of connecting the pipe sections 10, 11 to one another in leakproof relation.

The connection can be a permanent one, if desired, or it can be disrupted at a later date by applying a wrench to the tubular sub 12 and rotating the latter in a proper direction to unthread its pin 15 from the coupling elements or segments 26.

It is possible to connect the pipe sections 10, 11 to one another in a manner to facilitate their disconnection. The tubular sub 12 may have a right-hand threaded pin 15 on one of its ends and a left-hand threaded pin 13 at its other end, which would fit within companion right and left-hand threaded members 26 and 14, respectively. It would only be necessary to rotate the tubular sub 12 in the appropriate direction to secure its unthreading out of both the coupling segments 26 and the box 14, thereby avoiding the necessity for rotating any of the adjacent pipe sections 10, 11.

I claim:

1. In connecting apparatus: a tubular body; circumferentially spaced coupling segments carried by said body and having an internal threaded portion; toothed leaf springs carried by said body and disposed between said segments; a tubular member having an external threaded portion adapted to be placed within said internal threaded portion and said toothed leaf springs and in endwise adjacency to said body, said toothed leaf springs engaging said threaded portion on said tubular member to thereby locate said external threaded portion on said tubular member within the internal threaded portion of said coupling segments; means providing a seal between the adjacent end faces of said body and member; said threaded portions being meshable with each other; a collar slidable longitudinally on said body and having means engageable with said segments for shifting said segments laterally inwardly toward said member; cylinder and piston means on said body and collar; and means providing a fluid under pressure in said cylinder and piston means for shifting said collar longitudinally on said body to shift said segments inwardly and place their threaded portions in mesh with said member threaded portion, whereby said tubular member is connected in sealed relation to said tubular body.

2. In connecting apparatus: a tubular body; circumferentially spaced coupling segments carried by said body and having an internal threaded portion; toothed leaf springs carried by said body and disposed between said segments; a tubular member having an external threaded portion adapted to be placed within said internal threaded portion and said toothed leaf springs and in endwise adjacency to said body, said toothed leaf springs engaging said threaded portion on said tubular member to thereby locate said external threaded portion on said tubular member within the internal threaded portion of said coupling segments; means providing a seal between the adjacent end faces of said body and member; said threaded portions being meshable with each other; a collar slidable longitudinally on said body and having means engageable with said segments for shifting said segments laterally inwardly toward said member; means releasably securing said segments to said collar laterally outwardly of the threaded portion of said tubular member; cylinder and piston means on said body and collar; and means providing a fluid under pressure in said cylinder and piston means for shifting said collar longitudinally on said body to release said securing means and shift said segments laterally inwardly and place their threaded portion in mesh with said threaded portion of said tubular member, whereby said tubular member is connected in sealed relation to said tubular body.

3. In connecting apparatus: a tubular body; circumferentially spaced coupling segments carried by said body and having an internal threaded portion; toothed leaf springs carried by said body and disposed between said segments; a tubular member having an external threaded portion adapted to be placed within said internal threaded portion and said toothed leaf springs and in endwise adjacency to said body, said toothed leaf springs engaging said threaded portion on said tubular member to thereby locate said external threaded portion on said tubular member within the internal threaded portion of said coupling segments; means providing a seal between the adjacent end faces of said body and member; said threaded portions being meshable with each other; a collar slidable longitudinally on said body and having means engageable with said segments for shifting said segments laterally inwardly toward said member; means releasably securing said segments to said collar laterally outwardly of the threaded portion of said tubular member; cylinder and piston means on said body and collar; means providing a fluid under pressure in said cylinder and piston means for shifting said collar longitudinally on said body to release said securing means and shift said segments laterally inwardly and place their threaded portion in mesh with said threaded portion of said tubular member, whereby said tubular member is connected in sealed relation to said tubular body; and means preventing return longitudinal movement of said collar on said body.

4. In connecting apparatus: a fluid conducting body, a fluid conducting member in substantial axial alignment therewith, seal means in abutting relation with said body and member, connecting means on said member adjacent said seal means, a collar encasing said body, said member and said seal means, jaw means carried within said collar and on said body and disposed radially outward of said connecting means, means restraining movement of said jaw means between said collar and said body, and means so disposed as to react between said collar and said body to overcome said restraining means and to cause said jaw means to first grip said connecting means and to then compress said seal means.

5. In connecting apparatus as defined in claim 4; said reacting means comprising a fluid under pressure for shifting said collar longitudinally of said body.

6. In connecting apparatus as defined in claim 4; said reacting means comprising a gas producing combustible product carried by said body, and means for initiating combustion of said product to produce a gas under pressure for shifting said collar longitudinally of said body.

7. In connecting apparatus as defined in claim 4; said reacting means comprising a chamber defined between said body and collar, a gas producing combustible product in said chamber, and means for initiating combustion of said product to produce a gas under pressure for shifting said collar longitudinally of said body.

8. In connecting apparatus as defined in claim 4; said connecting means comprising a thread, said jaw means having a thread companion to and meshing with said connecting means thread to cause said jaw means to grip said connecting means.

9. In connecting apparatus as defined in claim 4; said connecting means comprising a thread, said jaw means having a thread companion to and meshing with said connecting means thread to cause said jaw means to grip said connecting means, said reacting means comprising a chamber defined between said body and collar, a gas producing combustible product in said chamber, and means for initiating combustion of said product to produce a gas under pressure for shifting said collar longitudinally of said body.

References Cited by the Examiner

UNITED STATES PATENTS

| 2,013,293 | 9/1935 | Snell | 285—336 X |
| 2,017,994 | 10/1935 | Spang | 285—145 X |
| 2,692,066 | 10/1954 | Conrad | 285—145 X |
| 2,864,623 | 12/1958 | Spink | 279—4 |
| 2,962,096 | 11/1960 | Knox | 285—18 X |
| 3,029,872 | 4/1962 | Hones | 166—63 |
| 3,097,866 | 7/1963 | Iverson | 285—322 |

FOREIGN PATENTS 622,595   2/1927   France.

CARL W. TOMLIN, *Primary Examiner.*

S. R. MILLER, D. W. AROLA, *Assistant Examiners.*